US010699006B1

(12) United States Patent
Wei et al.

(10) Patent No.: US 10,699,006 B1
(45) Date of Patent: Jun. 30, 2020

(54) PROCESSING AND STORING BLOCKCHAIN DATA UNDER A TRUSTED EXECUTION ENVIRONMENT

(71) Applicant: Alibaba Group Holding Limited, George Town (KY)

(72) Inventors: Changzheng Wei, Hangzhou (CN); Ying Yan, Hangzhou (CN); Boran Zhao, Hangzhou (CN); Xuyang Song, Hangzhou (CN); Huabing Du, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/671,010

(22) Filed: Oct. 31, 2019

Related U.S. Application Data

(63) Continuation of application No. PCT/CN2019/081182, filed on Apr. 3, 2019.

(51) Int. Cl.
*G06F 21/53* (2013.01)
*H04L 9/32* (2006.01)
*G06F 9/455* (2018.01)

(52) U.S. Cl.
CPC ............ *G06F 21/53* (2013.01); *H04L 9/3239* (2013.01); *G06F 9/45533* (2013.01);
(Continued)

(58) Field of Classification Search
CPC ................. G06F 21/53; G06F 9/45533; H04L 2209/127; H04L 2209/38
(Continued)

(56) References Cited

U.S. PATENT DOCUMENTS 10,445,698 B2 * 10/2019 Hunn .................... G06F 16/93
10,540,652 B2 * 1/2020 Saur .................... G06Q 20/223
(Continued)

FOREIGN PATENT DOCUMENTS

CN          106850200        6/2017
CN          107391649        11/2017
(Continued)

OTHER PUBLICATIONS

Behl et al., "Hybrids on Steroids:SGX-Based High Performance BFT," Apr. 2017, EuroSys '17:Proceedings of the Twelfth European Conference on Computer Systems, pp. 222-237.
(Continued)

*Primary Examiner* — Teshome Hailu
(74) *Attorney, Agent, or Firm* — Fish & Richardson P.C.

(57) ABSTRACT

Disclosed herein are methods, systems, and apparatus, including computer programs encoded on computer storage media, for processing blockchain data under a trusted execution environment (TEE). One of the methods includes receiving, by a blockchain node, a request to execute one or more software instructions in a TEE executing on the blockchain node; determining, by a virtual machine in the TEE, data associated with one or more blockchain accounts to execute the one or more software instructions based on the request; traversing, by the virtual machine, an internal cache hash table stored in the TEE to determine whether the data are included in the internal cache hash table; and in response to determining that the data is included in the internal cache hash table, executing, by the virtual machine, the one or more software instructions by retrieving the data from the internal cache hash table.

18 Claims, 5 Drawing Sheets

(52) U.S. Cl.
CPC .. *G06F 2221/034* (2013.01); *H04L 2209/127* (2013.01); *H04L 2209/38* (2013.01)

(58) Field of Classification Search
USPC .......................................................... 713/190
See application file for complete search history.

(56) References Cited

U.S. PATENT DOCUMENTS

| | | | |
|---|---|---|---|
| 2018/0041345 A1* | 2/2018 | Maim | G06F 21/51 |
| 2018/0145836 A1* | 5/2018 | Saur | H04L 9/3236 |
| 2018/0204016 A1 | 7/2018 | Duan | |
| 2019/0273617 A1* | 9/2019 | Maher | H04L 9/0844 |

FOREIGN PATENT DOCUMENTS

| | | |
|---|---|---|
| CN | 108055133 | 5/2018 |
| CN | 108763443 | 11/2018 |
| CN | 109102299 | 12/2018 |
| CN | 109559105 | 4/2019 |
| WO | WO 2018229632 | 12/2018 |

OTHER PUBLICATIONS

Cheng et al., "Ekiden: A Platform for Confidentiality-Preserving, Trustworthy, and Performant Smart Contract," 2019 IEEE European Symposium on Security and Privacy, Jun. 2019, pp. 185-200.

Crosby et al., "BlockChain Technology: Beyond Bitcoin," Sutardja Center for Entrepreneurship & Technology Technical Report, Oct. 16, 2015, 35 pages.

Dash.org [online], "Your money, your way," 2019, retrieved on Sep. 30, 2018, retrieved from URL<https://www.dash.org/>, 4 pages.

Github.com [online], "Coco-framework," May 2, 2019, retrieved on Sep. 30, 2018, retrieved from URL<https://github.com/Azure/coco-framework>, 2 pages.

Github.com [online], "Private-data-objects," Dec. 17, 2019, retrieved on Dec. 31, 2019, retrieved from URL<https://github.com/hyperledger-labs/private-data-objects>, 2 pages.

Github.com [online], "Quorum," Dec. 20, 2019, retrieved on Sep. 30, 2018, retrieved from URL<https://github.com/jpmorganchase/quorum>, 6 pages.

Kosba et al., "The blockchainmodel of cryptography and privacy-preserving smart contracts," 2016 IEEE Symposium on Security and Privacy (SP), Aug. 2016, pp. 839-858.

Lind et al., "Teechan: Payment Channels Using Trusted Execution Environments," arXiv preprint arXiv:1612.07766, Dec. 2016, 16 pages.

Microsoft, "The Coco Framework Technical Overview," Aug. 10, 2017, retrieved on Dec. 31, 2019, retrieved from URL<https://github.com/wooriapt/Coco-Framework-whitepaper/blob/master/Coco%20Framework%20whitepaper.pdf>, 27 pages.

Monero [online], "Private Digital Currency," 2019, retrieved on Sep. 30, 2018, retrieved from URL<https://web.getmonero.org/>, 5 pages.

Nakamoto, "Bitcoin: A Peer-to-Peer Electronic Cash System," www.bitcoin.org, 2005, 9 pages.

Weiser et al., "SGXIO: Generic Trusted I/O Path for Intel SGX," CODAPSY '17: Proceedings of the Seventh ACM on Conference on Data and Application Security and Privacy, Mar. 2017, pp. 261-268.

Wikipedia.org [online], "Trusted execution environment," Dec. 23, 2019, retrieved on Dec. 31, 2019, retrieved from URL<https://en.wikipedia.org/wiki/Trusted_execution_environment>, 8 pages.

Z.cash [online], "Zcash," 2019, retrieved on Sep. 30, 2018, retrieved from URL<https://z.cash/>, 3 pages.

PCT International Search Report and Written Opinion in Internaitonal Application No. PCT/CN2019/081182, dated Jan. 3, 2020, 7 pages.

Extended European Search Report in European Application No. 19732216.7, dated May 8, 2020, 8 pages.

Zhang et al., "A Method to Predict the Performace and Storage of Executing Contract for Ethereum Consortium-Blockchain," International Conference on Financial Cryptography and Data Security; Jun. 2018, pp. 63-74.

\* cited by examiner

PROCESSING AND STORING BLOCKCHAIN DATA UNDER A TRUSTED EXECUTION ENVIRONMENT

CROSS-REFERENCE TO RELATED APPLICATIONS

This application is a continuation of PCT Application No. PCT/CN2019/081182, filed on Apr. 3, 2019, which is hereby incorporated by reference in its entirety.

TECHNICAL FIELD

This specification relates to processing and storing blockchain data under a trusted execution environment.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain networks can operate on distributed computing platforms such as Ethereum. An Ethereum blockchain can be viewed as a transaction-based state machine. Ethereum can have a global "shared-state" referred to as a world state. The world state of Ethereum can include objects formed by Ethereum accounts. Each account can have a state and a corresponding address. The world state comprises a mapping between account addresses and account states. The mapping is stored in a data structure known as a Merkle Patricia tree (MPT).

In some cases, nodes of the blockchain network, and/or nodes that communicate with the blockchain network can operate using trusted execution environments (TEEs). The TEE can include an enclave trusted computing base (TCB) within hardware (one or more processors, memory) that is isolated from the hardware's operating environment (e.g., operating system (OS), basic input/output system (BIOS)). The TCB can include an Ethereum virtual machine (EVM) to process calls from applications outside of the enclave. In some cases, one or more values of a world state MPT stored outside of the TCB are retrieved by the EVM to process the calls within the TCB. After processing, the processing result of the call is output from the TCB to update the world state MPT. The data processing from transporting data between trusted and untrusted environments can consume additional computing resources and compromise data processing efficiency. It would be desirable to process the calls at least partially based on data stored in the TCB to reduce data traffic between trusted and untrusted environments to reduce computing resource consumption and improve data processing efficiency.

SUMMARY

This specification describes technologies for processing and storing blockchain data. These technologies generally involve receiving a request to execute one or more software instructions in a trusted execution environment (TEE) executing on the blockchain node; determining data associated with one or more blockchain accounts to execute the one or more software instructions based on the request; traversing an internal cache hash table stored in the TEE to determine whether the data are included in the internal cache hash table; and in response to determining that the data is included in the internal cache hash table, executing the one or more software instructions by retrieving the data from the internal cache hash table.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

This specification describes technologies for processing and storing blockchain data. These technologies generally involve receiving a request to execute one or more software instructions in a trusted execution environment (TEE) executing on the blockchain node; determining data associated with one or more blockchain accounts to execute the one or more software instructions based on the request; traversing an internal cache hash table stored in the TEE to determine whether the data are included in the internal cache hash table; and in response to determining that the data is included in the internal cache hash table, executing the one or more software instructions by retrieving the data from the internal cache hash table.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical *Byzantine* fault tolerance (PBFT) consensus, described in further detail below.

Figure 1:
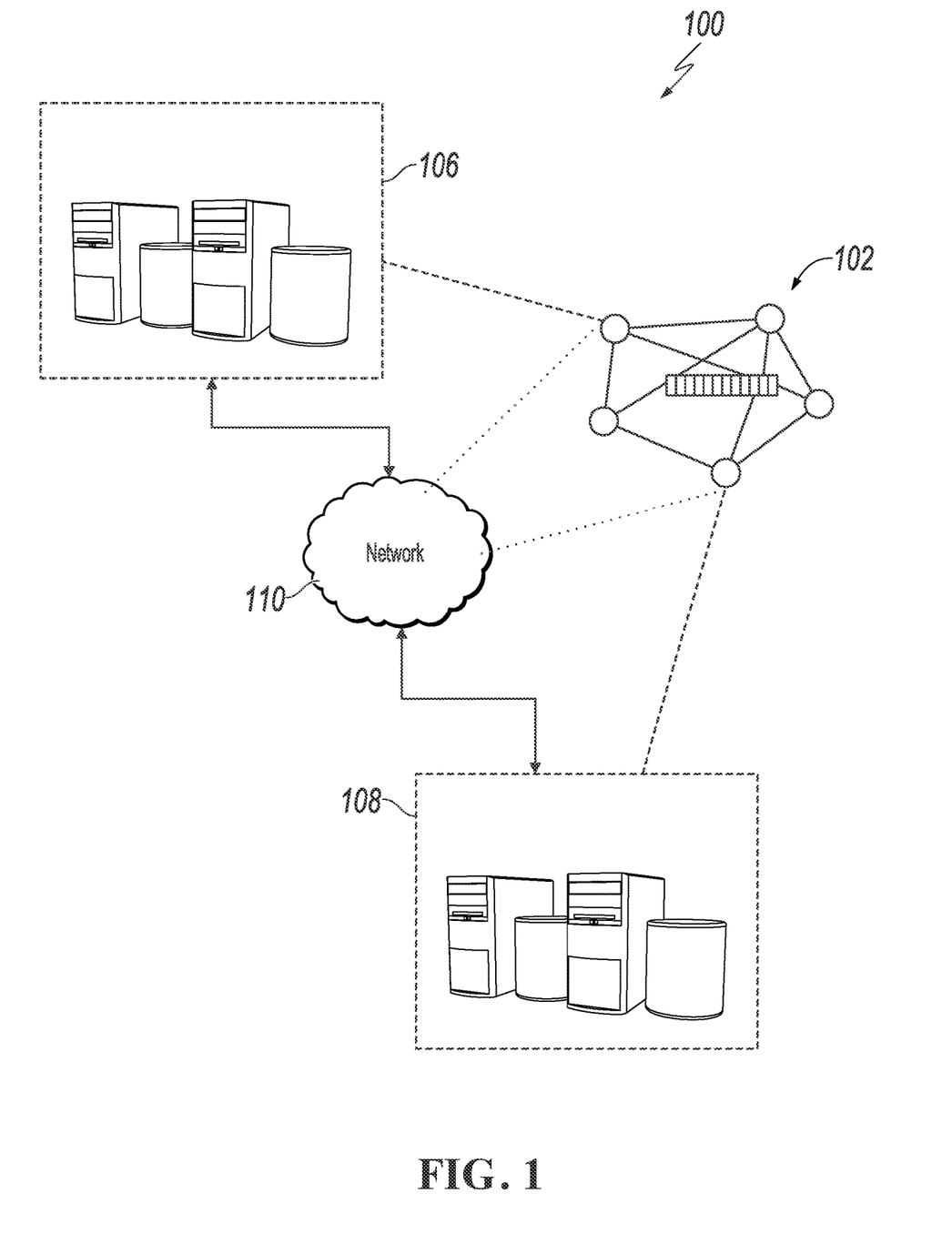
FIG. 1 is a diagram illustrating an example of an environment that can be used to execute embodiments of this specification.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
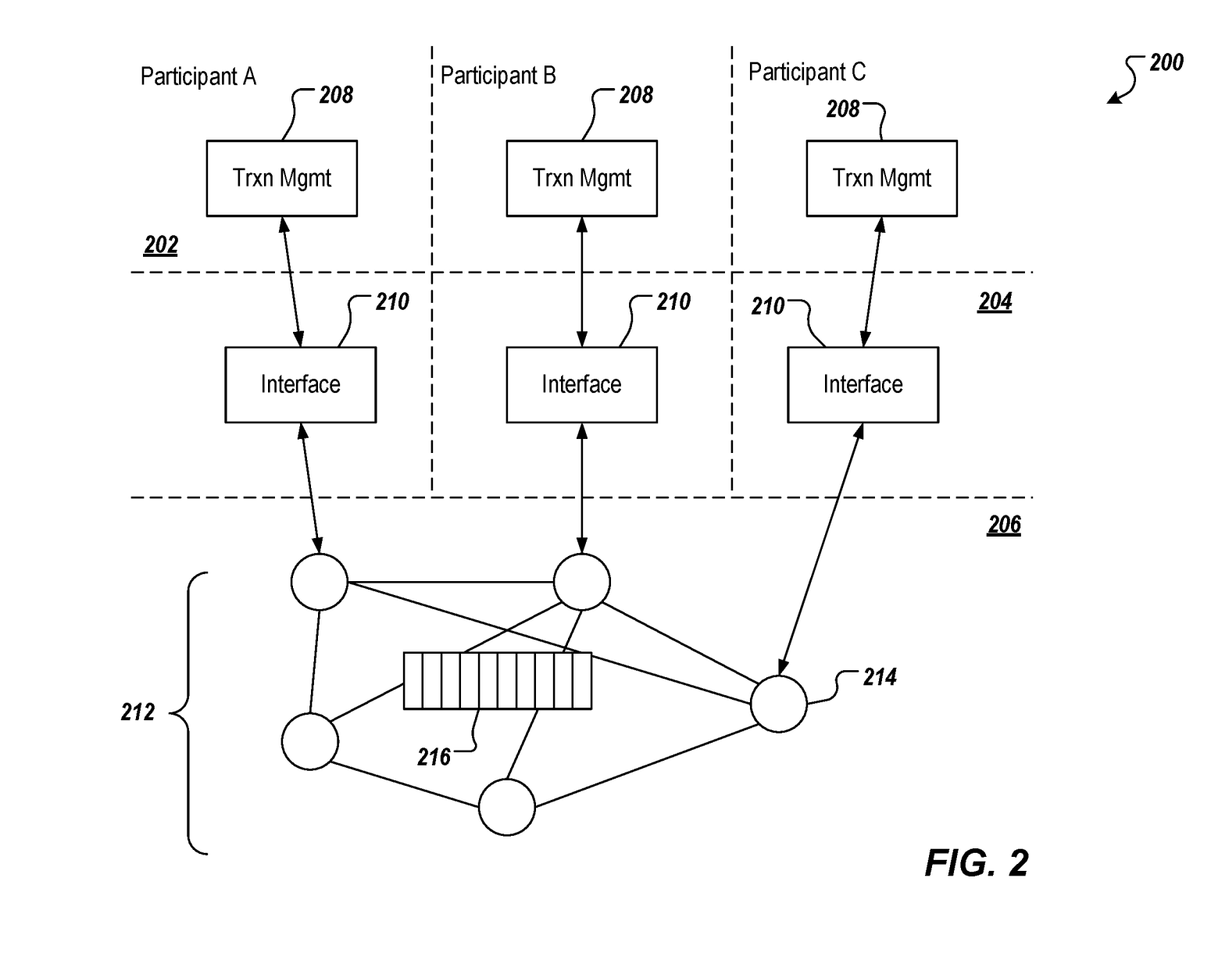
FIG. 2 is a diagram illustrating an example of an architecture in accordance with embodiments of this specification.

FIG. 2 depicts an example of an architecture 200 in accordance with embodiments of this specification. The architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some embodiments, the blockchain 216 stores information associated with transactions that are performed between two or more entities participating in the consortium blockchain network.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical *Byzantine* state machine replication that tolerates *Byzantine* faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network can operate using TEEs. At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied.

In some embodiments, a virtual machine operating inside of an enclave TCB can provide a trusted runtime environment for applications to securely execute smart contracts. The virtual machine can receive calls from the applications outside of the enclave. The calls can invoke enclave interface functions to initiate execution of the smart contracts. During smart contract execution, the virtual machine can retrieve data associated with blockchain accounts based on input parameters of the calls or content of the smart contracts. Data from blockchain accounts can include blockchain account states such as account balances or storage contents of the accounts (e.g., account variables).

In some cases, frequently accessed account data or account data likely to be accessed can be stored in an internal cache hash table inside of the enclave in plaintext. When retrieving account data to execute the smart contracts, the virtual machine can first traverse the internal cache hash table to locate the data. If the data cannot be located after traversing the internal cache hash table, a call can be made to outside of the enclave to traverse an external cache hash table stored in cache storage through direct memory access. The external cache hash table can store account information of frequently accessed accounts. If the account data cannot be located after traversing the external cache hash table, a call can be made to retrieve the account data from a Merkle Patricia tree (MPT) corresponding to the global state of the blockchain stored in a database.

Figure 3:
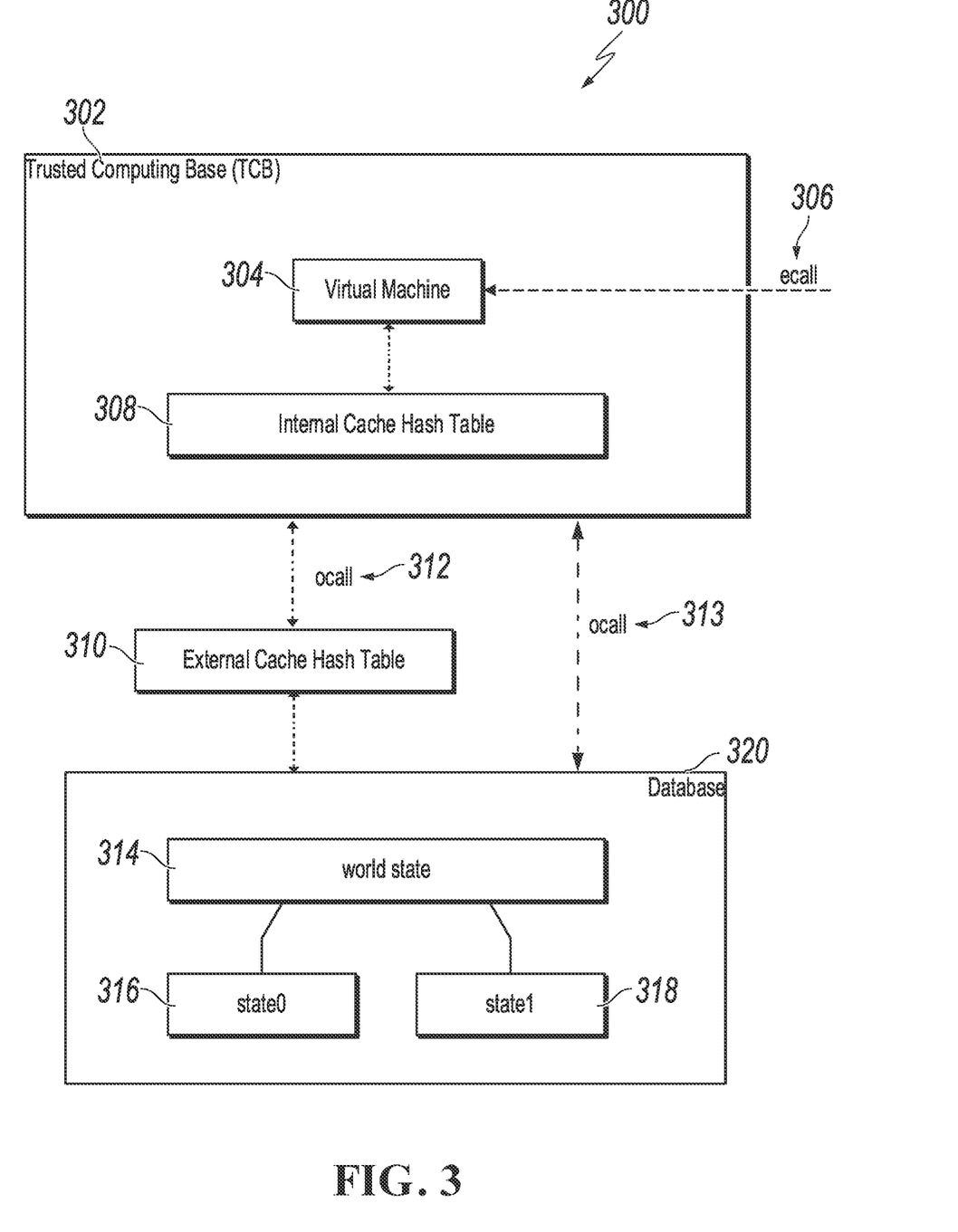
FIG. 3 is a diagram illustrating an example of a structure of a trusted execution environment (TEE) and a storage outside of the TEE in accordance with embodiments of this specification.

FIG. 3 is a diagram illustrating an example of a structure 300 of a TEE and a storage outside of the TEE in accordance with embodiments of this specification. At a high-level, the structure 300 includes a TEE in the form of an enclave TCB (or simply TCB) 302 that stores a virtual machine 304 and an internal cache hash table 308, an external cache hash table 310, and a world state 314 in the form of an MPT stored in a database 320.

As discussed above, a TA, such as an SGX enabled application, can include a trusted component (or enclave component) and an untrusted component (application component). The application component is located outside of the enclave and can access the TCB 302 through enclave interface functions. In some embodiments, the enclave can expose an application programming interface (API) for the application component to call in. The application component can use the API to make "ecalls" 306 to invoke a virtual machine 304 in the enclave to execute smart contracts. The virtual machine can be an emulation of a computer system. For example, the virtual machine can be an Ethereum virtual machine (EVM) under the context of an Ethereum blockchain. It is to be understood that other blockchain networks can use other variations of virtual machines. After receiving an ecall 306, the virtual machine 304 can identify one or more blockchain accounts related to executing the smart contracts. The identification can be based on one or more input parameters of the ecall 306 or the content of the smart contracts. For example, an ecall 306 can be made by an application component to execute a smart contract of adding a new transaction between two blockchain accounts to the blockchain. The virtual machine 305 can identify keys (i.e., account addresses) to retrieve account balances from the corresponding account states.

After identifying the account data to be used to execute the smart contract, the virtual machine 304 can traverse the internal cache hash table 308 to locate the account data. In some embodiments, frequently accessed account data or data likely to be accessed can be stored in an internal cache hash table 308 in the TCB 302. The internal cache hash table 308 can be a two-dimensional (2D) table that stores KVPs corresponding to the data. The data stored in the internal cache hash table 308 can be those that are most likely to be retrieved by the virtual machine 304 to execute the smart contracts. The likelihood can be estimated based on historical or predicted account access frequency. In some examples, the frequently accessed account data can be the data that were retrieved by the virtual machine 304 over a predetermined number of times or during a predetermined time period. In some examples, the data likely to be accessed can be the data that were previously retrieved to execute smart contracts related to the smart contract that is currently executed.

The corresponding KVPs of the data in the internal cache hash table 308 can be retrieved from the world state 314 MPT of the blockchain. As such, the likelihood that the virtual machine 304 can retrieve at least a portion of account data from the internal cache hash table to execute the smart contract increases. Correspondingly, the likelihood that the virtual machine 304 needs to retrieve account data from outside of the TCB 302 decreases.

The world state 314 can sometimes be referred to as a global state. Each blockchain network can have one global state. The global state can include a mapping between account addresses and the account states of the blockchain. Each blockchain account is an object of the global state. As discussed above, the global state mapping can be stored in a data structure known as an MPT. The account addresses and account states can be stored in the MPT as KVPs. The global state MPT is a hash of the global state at a given point in time. The global state can include a root node used as a secure and unique identifier for the MPT. The global state MPT's root node can be cryptographically dependent on data representing the account states.

In the structure 300 depicted in FIG. 3, two accounts with respective account state0 316 and account state1 318 are shown under the world state 314. It is to be understood that the blockchain network can include more than two accounts. The blockchain accounts can be externally owned accounts and contract accounts. Externally owned accounts can be controlled by private keys and are not associated with any code. Contract accounts can be controlled by their contract code and have code associated with them.

In some embodiments, the account state can include four components known as nonce, balance, codeHash, and storageRoot. If the account is an externally owned account, the nonce can represent the number of transactions sent from the account address. The balance can represent the digital assets owned by the account. The codeHash is the hash of an empty string. The storageRoot is empty. If the account is a contract account, the nonce can represent the number of contracts created by the account. The balance can represent the digital assets owned by the account. The codeHash can be the hash of a virtual machine code associated with the account. The storageRoot can store a hash of the root node of an MPT referred to as a storage tree. The storage tree can store contract data by encoding the hash of the storage contents of the account. Since the storage tree also has a data structure of MPT, it can include one or more branch nodes and leaf nodes that store contract data or variables.

If the virtual machine 304 cannot locate the account data after traversing the internal cache hash table 308, it can make a call 312 to locate the data from outside of the TCB 302. A call made from within the enclave to an outside application component can be referred to as an ocall 312. In some embodiments, the ocall 312 can be made to retrieve the data from an external cache hash table 310 stored in a cache memory outside of the enclave. The external cache hash table 310 can be a 2D table that stores data of frequently accessed accounts or accounts that are likely to be accessed. Data of an account can include the account state (i.e., nonce, balance, codeHash, etc.) and the storage content stored as the storage tree. The external cache hash table 310 can store KVPs corresponding to account states and storage contents of the frequently accessed accounts. The corresponding KVPs stored in the external cache hash table 310 can be retrieved from the world state 314. In some examples, the external cache hash table 310 can be accessed from the enclave through direct memory access.

If the virtual machine 304 cannot locate the account data after traversing the external cache hash table 310, the virtual machine can traverse the world state 314 stored in a database 320 to locate the account data. In some examples, the database 320 can be databases for KVPs, such as RocksDB or LevelDB.

After using the account data to execute the smart contract, the execution results can be used to update the world state 314. If the account data used are stored in the internal cache hash table 308, the KVPs corresponding to the updated account data can be first cache synchronized with the corresponding KVPs in the external cache hash table 310. Afterwards, the external cache hash table 310 can cache synchronize the corresponding KVPs with the database 320 to update them in the world state 314 MPT. If the account data used are stored in the external cache hash table 308, the virtual machine 304 can make an ocall 312 to update the corresponding KVPs in the external cache hash table 310. The external cache hash table 310 can then cache synchronize with the database 320 to update the corresponding KVPs in the world state 314.

If the account data used are stored in the database 320, the virtual machine 304 can make an ocall 313 to update the corresponding KVPs in the world state 314. As described above, output data is encrypted before exiting the enclave. As such, the external cache hash table 310 and the world state 308 stored outside of the TCB 302 cannot be viewed without obtaining the corresponding decryption key.

By storing frequently access account data in the internal cache hash table 308 inside of the TCB 302, the likelihood that the virtual machine 304 needs to retrieve account data from outside of the TCB 302 to execute smart contracts can be reduced. As data entering and exiting the enclave TCB 302 needs to be decrypted and encrypted, which increase computational burden, less calls for data outside of the TCB 302 can reduce computational resource consumption and improve computational efficiency.

Figure 4:
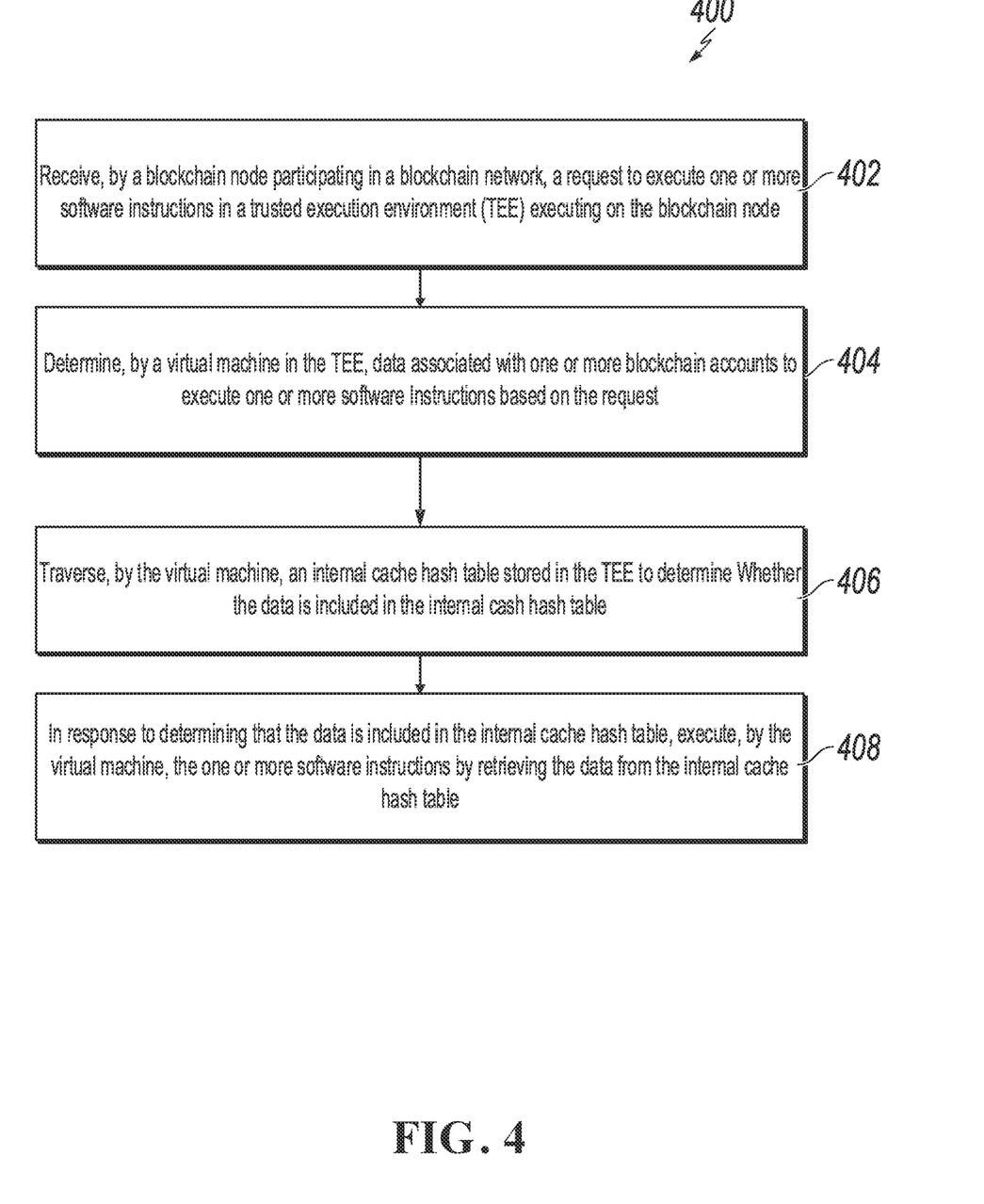
FIG. 4 is a flowchart of an example of a process for processing and storing blockchain data in accordance with embodiments of this specification.

FIG. 4 is a flowchart of an example of a process 400 for processing and storing blockchain data in accordance with embodiments of this specification. For convenience, the process 400 will be described as being performed by a system of one or more computers, located in one or more locations, and programmed appropriately in accordance with this specification. For example, computing systems 106, 108 of FIG. 1, appropriately programmed, can perform the process 400.

At 402, a blockchain node participating in a blockchain network receives a request to execute one or more software instrucitons in a TEE executing on the blockchain node.

At 404, a virtual machine in the TEE determines data associated with one or more blockchain accounts associated with the one or more software instructions. In some examples, the blockchain accounts are associated with a blockchain maintained by the blockchian network. In some examples, the plurality of blockchain accounts include one or more of externally owned accounts or contract accounts, and wherein each of the contracts accounts includes a storage root. In some examples, the storage root includes a hash of a root node of an MPT. The MPT can encode hash of storage contents of the corresponding contract account.

At 406, the virtual machine traverses an internal cache hash table stored in the TEE to determine that the data are included in an internal cache hash table. In some examples, the data associated with the one or more blockchain accounts are one or more KVPs, and the internal cache hash table stores a plurality of KVPs associated with frequently accessed storage contents of a plurality of accounts of a blockchain.

At 408, in response to determining that the data is included in the internal cache hash table, the virtual machine executes the one or more software instructions by retrieving the data from the internal cache hash table. In some examples, in response to executing the one or more software instructions, the virtual machine updates the one or more KVPs. In some example, the blockchain node synchronizes the internal cache hash table with an external cache hash table that includes the one or more KVPs. In some examples, the external cache hash table is stored in a cache separate from the TEE. In some examples, the external cache hash table stores a plurality of KVPs associated with one or more frequently-accessed accounts of the blockchain.

In some embodiments, the request is a first request, the one or more software instructions are first software instructions, the one or more KVPs are first KVPs. The blockchain node further receives a second request to execute second software instructions in the TEE. The virtual machine determines second KVPs associated with the second software instructions, and the virtual machine determines that the second KVPs are not included in the internal cache hash table.

In some embodiments, in response to determining that the second KVPs are not included in the internal cache hash table, the virtual machine further determines that the second KVPs are included in the external cache hash table. In some examples, the virtual machine accesses the external cache hash table through direct memory access. The virtual machine executes the second software instructions based on the second KVPs. In response to executing the one or more software instructions, the blockchain node updates the second KVPs included in the external cache hash table, and synchronizes the external cache hash table with a global state of the blockchain stored in a database separate from the TEE.

In some embodiments, in response to determining that the second KVPs are not included in the internal cache hash table, the virtual machine determines that the second KVPs are not included in the external cache hash table. In response to determining that the second KVPs are not included in the external cache hash table, the virtual machine executes the second software instructions by retrieving the second KVPs from the global state of the blockchain, and the blockchain node updates the second KVPs in response to executing the one or more software instructions. In some embodiments, the global state is stored in the database as an MPT.

Figure 5:
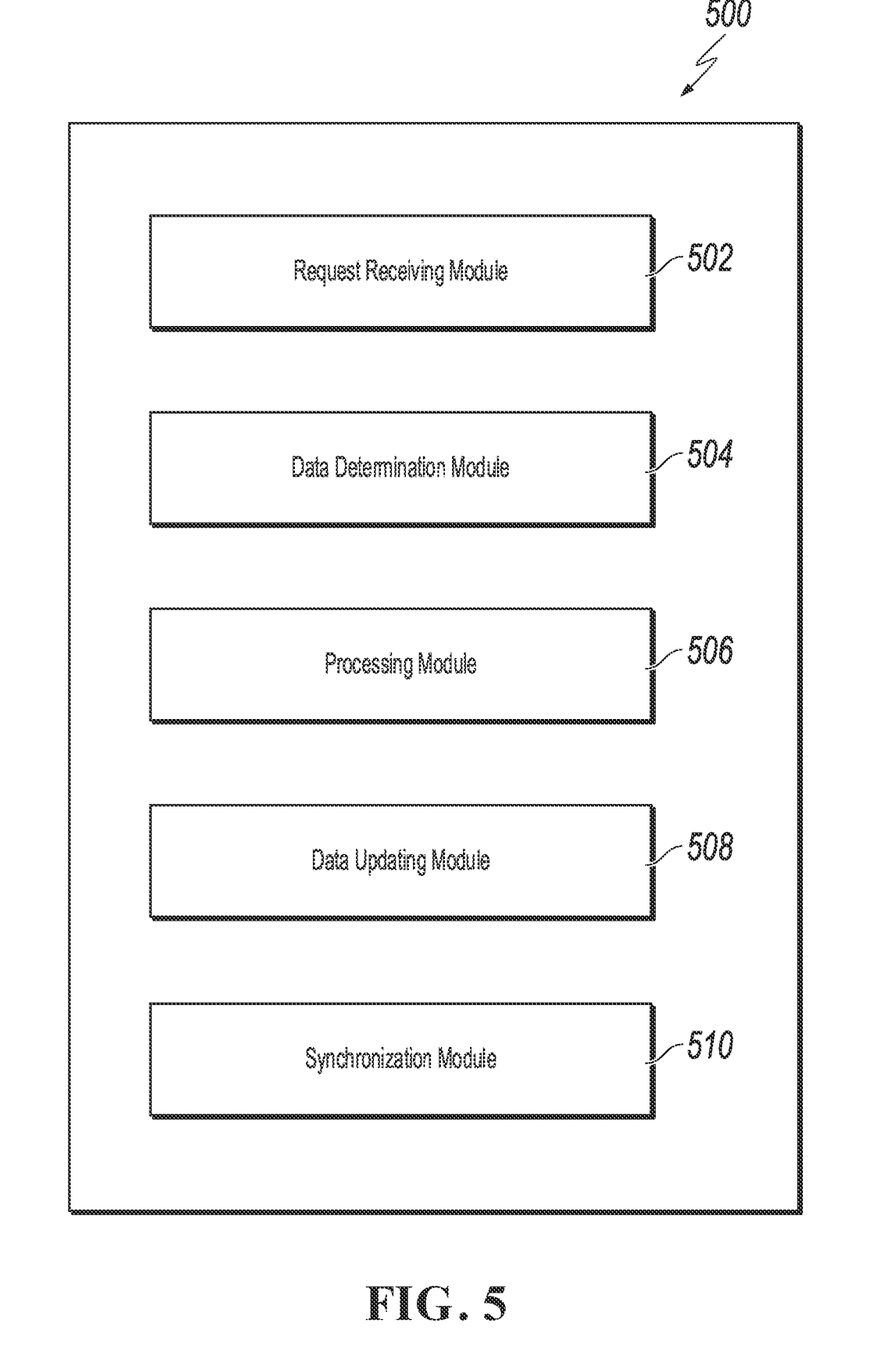
FIG. 5 depicts examples of modules of an apparatus in accordance with embodiments of this specification.

FIG. 5 is a diagram of on example of modules of an apparatus 500 in accordance with embodiments of this specification. The apparatus 500 can be an example of an embodiment of a trusted hardware including portions of the CPU and physical memory. The apparatus 500 can correspond to the embodiments described above, and the apparatus 500 includes the following:

A request receiving module 502 to receive a request to execute one or more software instructions in a TEE executing on the blockchain node; a data determination module 504 to determine data associated with one or more blockchain accounts associated with the one or more software instructions, wherein the blockchain accounts are associated with a blockchain maintained by the blockchain network, and determine that the data is included in an internal cache hash table stored in the TEE; a processing module 506 to execute the one or more software instructions based on the one or more KVPs in response to determining that the data is included in the internal cache hash table; a data updating sub-module 508 to update the data in response to executing the one or more software instructions; and a synchronization sub-module 510 to synchronize the internal cache hash table with an external cache hash table that includes the one or more KVPs, wherein the external cache hash table is stored in a cache separate from the TEE.

Optionally, internal cache hash table stores KVPs associated with frequently-accessed blockchain accounts of the blockchain.

Optionally, the request is a first request, the one or more software instructions are first software instructions, the one or more KVPs are first KVPs, and the request receiving module 502 further receives a second request to execute second software instructions in the TEE; the KVP determination module 504 determines a second KVPs associated with the second software instructions, and that the second KVPs are not included in the internal cache hash table.

Optionally, in response to determining that the second KVPs are not included in the internal cache hash table, the KVP determination module 504 determines that the second KVPs are included in the external cache hash table, wherein the virtual machine accesses the external cache hash table through direct memory access; the processing module 506 executes the second software instructions based on the second KVPs; in response to executing the one or more software instructions, the KVP updating module 508 updates the second KVPs included in the external cache hash table; and the synchronization module 510 synchronizes the external cache hash table with a global state of the blockchain stored in a database separate from the TEE.

Optionally, the external cache hash table stores a plurality of KVPs associated with one or more frequently-accessed accounts of the blockchain.

Optionally, in response to determining that the second KVPs are not included in the internal cache hash table, the KVP determination module 504 determines that the second KVPs are not included in the external cache hash table; in response to determining that the second KVPs are not included in the external cache hash table, the processing unit 506 executes the second software instructions by retrieving the second KVPs from the global state of the blockchain; and the KVP updating unit 508 updates the second KVPs in response to executing the one or more software instructions.

Optionally, the global state is stored in the database as an MPT.

Optionally, the global state includes a mapping between addresses and states of a plurality of blockchain accounts of the blockchain, and the plurality of blockchain accounts include one or more of externally-owned accounts or contract accounts, and wherein each of the contract accounts includes a storage root.

The techniques described in this specification produce several technical effects. For example, embodiments of the subject matter permit a blockchain virtual machine running in a trusted environment to receive calls from applications outside of a TCB to execute smart contracts. By storing the frequently accessed blockchain account in an internal cache hash table inside the TCB, the likelihood that the virtual machine can retrieve blockchain data from within the TCB increases. Consequently, the data traffic between trusted and untrusted components decreases. Because data traveling between the trusted and untrusted components need to be encrypted or decrypted, less data traffic through enclave can result in less computational resource consumption and higher data security. Moreover, by including the frequently accessed account data within the TCB, the data retrieval and update are more likely performed based on plaintext in a trusted environment to improve computational efficiency and data security.

The described methodology permits enhancement of various blockchain transactions and overall transaction/data security. Blockchain users that initiate the call to execute smart contracts can be confident that the computations are performed in a trusted environment and the computational results cannot be altered.

The described methodology can ensure the efficient usage of computer resources (for example, processing cycles, network bandwidth, and memory usage), because frequently accessed blockchain data are stored in plaintext, and retrieved and updated inside of the TEE. At least these actions can reduce waste of available computer resources with respect to blockchain data encryption and decryption. Instead of virtual machines needing to decrypt data retrieved from outside of TEE for smart contract processing, they can directly operate on plaintext inside of the enclave for frequently accessed data.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for processing blockchain data under a trusted execution environment (TEE), the method comprising:
   receiving, by a blockchain node, a request to execute one or more software instructions in a TEE executing on the blockchain node;
   determining, by a virtual machine in the TEE, data associated with one or more blockchain accounts to execute the one or more software instructions based on the request, wherein the data associated with the one or more blockchain accounts are one or more key-value pairs (KVPs), and an internal cache hash table stores a plurality of KVPs associated with frequently accessed storage contents of a plurality of accounts of a blockchain;
   traversing, by the virtual machine, the internal cache hash table stored in the TEE to determine whether the data are included in the internal cache hash table;
   traversing, by the blockchain node, an external cache hash table through direct memory access to determine a first portion of KVPs that are included in the external cache hash table and a second portion of KVPs that are not included in the internal cache hash table;
   in response to determining that the data is included in the internal cache hash table, executing, by the virtual machine, the one or more software instructions by retrieving the data from the internal cache hash table and by retrieving the second portion of KVPs from the external cache hash table, if the second portion of KVPs are included in the external cache hash table;
   updating, by the virtual machine, the internal cache hash table in response to executing the one or more software instructions;

updating, by the blockchain node, the external cache hash table in response to executing the one or more software instructions; and synchronizing, by the blockchain node, the external cache hash table with a global state of a blockchain stored in a database separate from the TEE and the internal cache hash table with the external cache hash table that comprises data associated with the one or more blockchain accounts, wherein the external cache hash table is stored in a cache memory separate from the TEE.

2. The computer-implemented method of claim 1, wherein the external cache hash table stores a plurality of KVPs associated with states and storage content of frequently accessed accounts of the blockchain.

3. The computer-implemented method of claim 1, further comprising:

executing, by the virtual machine, the one or more software instructions by retrieving the second portion of KVPs from the global state, if the second portion of—KVPs are not included in the internal cache hash table or the external cache hash table; and updating, by the blockchain node, the global state in response to executing the one or more software instructions.

4. The computer-implemented method of claim 1, wherein the global state is stored in the database outside of an enclave as a Merkle Patricia tree (MPT).

5. The computer-implemented method of claim 1, wherein the global state includes a mapping between addresses and states of a plurality of blockchain accounts of the blockchain, and the plurality of blockchain accounts include one or more of externally owned accounts or contract accounts, and wherein each of the contracts accounts includes a storage root.

6. The computer-implemented method of claim 5, wherein the storage root comprises a hash of a root node of an MPT, and wherein the MPT encodes hash of storage contents of the corresponding contract account.

7. A non-transitory, computer-readable storage medium storing one or more instructions executable by a computer system to perform operations for processing blockchain data under a trusted execution environment (TEE), the operations comprising:

receiving, by a blockchain node, a request to execute one or more software instructions in a TEE executing on the blockchain node;

determining, by a virtual machine in the TEE, data associated with one or more blockchain accounts to execute the one or more software instructions based on the request, wherein the data associated with the one or more blockchain accounts are one or more key-value pairs (KVPs), and an internal cache hash table stores a plurality of KVPs associated with frequently accessed storage contents of a plurality of accounts of a blockchain;

traversing, by the virtual machine, the internal cache hash table stored in the TEE to determine whether the data are included in the internal cache hash table;

traversing, by the blockchain node, an external cache hash table through direct memory access to determine a first portion of KVPs that are included in the external cache hash table and a second portion of KVPs that are not included in the internal cache hash table;

in response to determining that the data is included in the internal cache hash table, executing, by the virtual machine, the one or more software instructions by retrieving the data from the internal cache hash table and by retrieving the second portion of KVPs from the external cache hash table, if the second portion of KVPs are included in the external cache hash table;

updating, by the virtual machine, the internal cache hash table in response to executing the one or more software instructions;

updating, by the blockchain node, the external cache hash table in response to executing the one or more software instructions; and synchronizing, by the blockchain node, the external cache hash table with a global state of a blockchain stored in a database separate from the TEE and the internal cache hash table with the external cache hash table that comprises data associated with the one or more blockchain accounts, wherein the external cache hash table is stored in a cache memory separate from the TEE.

8. The non-transitory, computer-readable storage medium of claim 7, wherein the external cache hash table stores a plurality of KVPs associated with states and storage content of frequently accessed accounts of the blockchain.

9. The non-transitory, computer-readable storage medium of claim 7, the operations further comprising:

executing, by the virtual machine, the one or more software instructions by retrieving the second portion of KVPs from the global state, if the second portion of KVPs are not included in the internal cache hash table or the external cache hash table; and updating, by the blockchain node, the global state in response to executing the one or more software instructions.

10. The non-transitory, computer-readable storage medium of claim 7, wherein the global state is stored in the database outside of an enclave as a Merkle Patricia tree (MPT).

11. The non-transitory, computer-readable storage medium of claim 7, wherein the global state includes a mapping between addresses and states of a plurality of blockchain accounts of the blockchain, and the plurality of blockchain accounts include one or more of externally owned accounts or contract accounts, and wherein each of the contracts accounts includes a storage root.

12. The non-transitory, computer-readable storage medium of claim 11, wherein the storage root comprises a hash of a root node of an MPT, and wherein the MPT encodes hash of storage contents of the corresponding contract account.

13. A computer-implemented system for processing blockchain data under a trusted execution environment (TEE), the computer-implemented system comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a blockchain node, a request to execute one or more software instructions in a TEE executing on the blockchain node, determining, by a virtual machine in the TEE, data associated with one or more blockchain accounts to execute the one or more software instructions based on the request, wherein the data associated with the one or more blockchain accounts are one or more key-value pairs (KVPs), and an internal cache hash table stores a plurality of KVPs associated with frequently accessed storage contents of a plurality of accounts of a blockchain;

traversing, by the virtual machine, the internal cache hash table stored in the TEE to determine whether the data are included in the internal cache hash table;

traversing, by the blockchain node, an external cache hash table through direct memory access to determine a first portion of KVPs that are included in the external cache hash table and a second portion of KVPs that are not included in the internal cache hash table;

in response to determining that the data is included in the internal cache hash table, executing, by the virtual machine, the one or more software instructions by retrieving the data from the internal cache hash table and by retrieving the second portion of KVPs from the external cache hash table, if the second portion of KVPs are included in the external cache hash table;

updating, by the virtual machine, the internal cache hash table in response to executing the one or more software instructions;

updating, by the blockchain node, the external cache hash table in response to executing the one or more software instructions; and synchronizing, by the blockchain node, the external cache hash table with a global state of a blockchain stored in a database separate from the TEE and the internal cache hash table with the external cache hash table that comprises data associated with the one or more blockchain accounts, wherein the external cache hash table is stored in a cache memory separate from the TEE.

14. The computer-implemented system of claim 13, wherein the external cache hash table stores a plurality of KVPs associated with states and storage content of frequently accessed accounts of the blockchain.

15. The computer-implemented system of claim 13, the operations further comprising:

executing, by the virtual machine, the one or more software instructions by retrieving the second portion of KVPs from the global state, if the second portion of KVPs are not included in the internal cache hash table or the external cache hash table; and updating, by the blockchain node, the global state in response to executing the one or more software instructions.

16. The computer-implemented system of claim 13, wherein the global state is stored in the database outside of an enclave as a Merkle Patricia tree (MPT).

17. The computer-implemented system of claim 13, wherein the global state includes a mapping between addresses and states of a plurality of blockchain accounts of the blockchain, and the plurality of blockchain accounts include one or more of externally owned accounts or contract accounts, and wherein each of the contracts accounts includes a storage root.

18. The computer-implemented system of claim 17, wherein the storage root comprises a hash of a root node of an MPT, and wherein the MPT encodes hash of storage contents of the corresponding contract account.

* * * * *

UNITED STATES PATENT AND TRADEMARK OFFICE
CERTIFICATE OF CORRECTION

| | |
|---|---|
| PATENT NO. | : 10,699,006 B1 |
| APPLICATION NO. | : 16/671010 |
| DATED | : June 30, 2020 |
| INVENTOR(S) | : Wei et al. |

It is certified that error appears in the above-identified patent and that said Letters Patent is hereby corrected as shown below:

In the Claims

In Column 17, Lines 19-20 Claim 3, delete "portion of-KVPs" and insert -- portion of KVPs --, therefor.

Signed and Sealed this
Fourth Day of January, 2022

Drew Hirshfeld
*Performing the Functions and Duties of the
Under Secretary of Commerce for Intellectual Property and
Director of the United States Patent and Trademark Office*